Figures 1, 2:
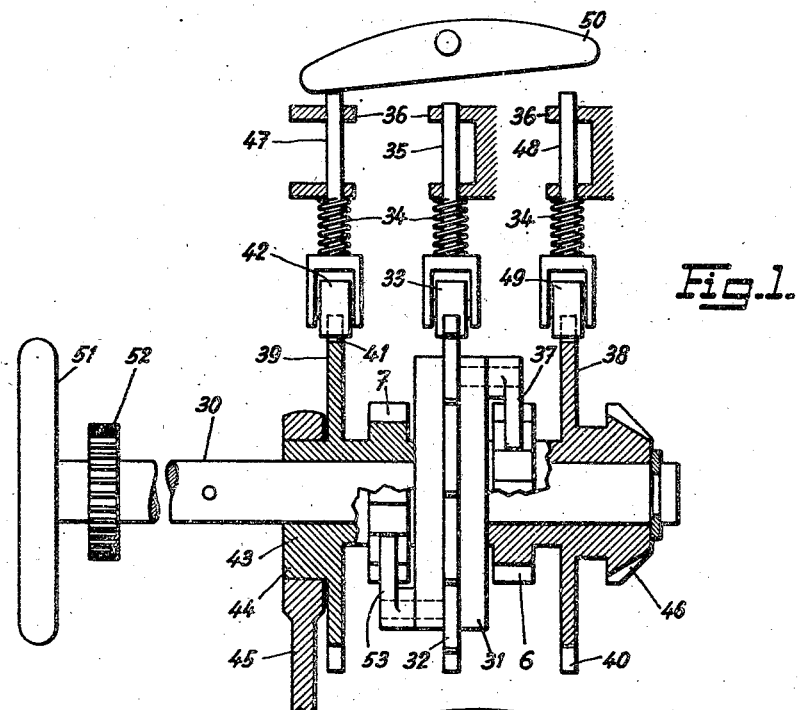

May 27, 1947. E. A. DERUNGS 2,421,188
TRANSMISSION CONTROL DEVICE
Filed Dec. 23, 1943

Inventor:
Ernest Alphonse Derungs
By Glenn Downing Huber
Attorneys

Patented May 27, 1947

2,421,188

UNITED STATES PATENT OFFICE 2,421,188

TRANSMISSION CONTROL DEVICE

Ernest Alphonse Derungs, Le Locle, Switzerland

Application December 23, 1943, Serial No. 515,407
In Switzerland May 24, 1943

5 Claims. (Cl. 192—3.5)

Object of the present invention is a control device.

There are certain machines, specially machine tools, for instance, lathes which are equipped with speed selectors by means of which different speeds can be imparted to the main shaft as desired by the operator. In such selectors which may, e. g., be of the type described in my application No. 497,376 which has eventuated in Patent No. 2,388,043, dated October 30, 1945, putting the change wheels necessary for the speed changes into place is generally done by means of the lever controlling the main coupling, that is the one controlling the coupling of the machine to the motor. Although all the means, those for selection as well as those for coupling, or putting the change wheels into place respectively, are in proximity with regard to one another, manipulation errors can take place. It is, for instance, very important that, after having chosen a speed, all the movements necessary for putting the change wheels into place are executed, even if another speed is to be chosen when the manipulation is finished, in case the first speed should not correspond to that which must be inserted.

Object of the invention is a control device of the above kind, e. g. for a machine tool which is characterised in that it comprises a control set coupled in the one direction of rotation with the speed selector and in the other direction with the coupling.

In this way a manipulation of the selector, when the coupling operation has begun, is prevented. Besides this, such a control set can be operated at a distance, e. g. by means of a steering wheel which on a lathe of a certain length, advances with the carriage carrying the tools, i. e., a wheel which is constantly within reach of the operator.

The accompanying drawings illustrate by way of examples, two embodiments of the control device according to the invention.

Fig. 1 is an axial section through the first, and

Fig. 2 a similar section through the second embodiment.

To the shaft 30 a wheel 31 provided with notches 32 is keyed-on, carrying, on the one face, a pawl 37 and, on the other face, a pawl 53. These pawls work in different directions; pawl 37 engages ratchet wheel 6 loosely mounted on the shaft 30 and pawl 53 cooperates with ratchet wheel 7 likewise loosely mounted on the shaft 30.

The hub of the wheel 6 carries a second wheel 38 whose notches 40 correspond to those 32 of the wheel 31 with a slight angular displacement. A stopping roller 49 pressed against the wheel 38 by a spring 34 and mounted on the rod 48 slidably arranged on bearings 36 of the frame is destined to engage these notches 40.

A stopping roller 33 mounted on the rod 35 likewise slidably disposed on bearings 36 of the frame cooperates with the numbering wheel 31.

The hub of the ratchet wheel 7 carries a cam 39 with a notch 41, a roller 42 being mounted on a rod 47 and pressed against the cam 39 by a spring 34.

The hub 43 of the ratchet wheel 7 carries also an eccentric 44 cooperating with a coupling member formed as a rod 45 connected to the non-represented main coupling lever of the machine to be controlled, therefore, likewise to the means for putting the change wheels in the gear box into place, e. g. such as shown in my application No. 497,376.

The hub of the ratchet wheel 6 carries a speed selector member formed as a toothed wheel 46 in connection with the non-represented selecting cams of a selector e. g. as described in my application No. 497,376. The shaft 30 of the illustrated control set is, by means of non-represented mechanical means, in relation to a steering wheel 51 which may e. g. be mounted on the carriage of a lathe or on the frame of the device itself. An indicator 52 showing the position of wheel 38 is fixed to the shaft of this steering wheel 51 rotating in front of a non-illustrated fixed pointer, the graduation of this indicator corresponding to the number of speeds obtainable with the selector and likewise to the number of notches of the wheels 31 and 38.

The rods 47 and 48 are placed under a rocking member 50 in such a way that only one of the rollers 42, 49 is allowed by said member to disengage at one and the same time. The device illustrated works as follows:

When the steering wheel 51 is rotated in the clockwise direction, the ratchet wheel 6 and the wheel 38 are taken along by the pawl 37 while the pawl 53 is moved over the ratchet wheel 7 actually at rest. During this rotation the selecting process takes place. When the steering wheel 51 is rotated in the anticlockwise direction, the ratchet wheel 7 and the cam 39 are taken along by the pawl 53 while the pawl 37 is moved over the ratchet wheel 6 actually at rest. During a whole revolution of the steering wheel 51 the rod 45 has made an advance and a return stroke during which the disengagement of the machine, the changing of the change wheels and the reengagement of the machine take place. After this revolution the device is again ready either for a new selecting operation or a new coupling manipulation.

An anticlockwise rotation of the steering wheel 51, i. e., a movement of the cam 39 is only possible if the stopping roller 49 is in a notch of the wheel 38, i. e., if the rod 48 gives the rocking member 50 free way to oscillate under the influence of rod 47, i. e. if the roller 49 engages a notch of wheel 38. On the contrary, a rotation of the selector member 46 is only possible if the roller 42 engages the notch 41 corresponding to the engaged state of the machine.

In the example shown in Fig. 2, to the shaft 60 a hub 61 is keyed-on, carrying the axles 62 of spider pinions 63 belonging to a differential gear whose central wheels 64 and 65 are loosely mounted on the shaft 60. These wheels 64, 65 are rigidly connected with ratchet wheels 66 and 67 cooperating with pawls 68 and 69 in different directions. Therefore, each of the central wheels 64, 65 can only rotate in one direction. The hub of the wheel 66 carries a wheel 70 whose notches correspond to the different positions of the non-illustrated speed selector which can be operated by the bevel gear 71. A stopping roller 72, whose rod 74 is slidably mounted on bearings 75, is pressed into the notches of the wheel 70 by a spring 73. The hub of the wheel 65 carries a cam 76 having a notch 77 destined to receive a stopping roller 78 pressed against the cam 76 by a spring 79. The rod 80 of this stopping roller is slidably mounted on the bearings 81. The hub of the wheel 65 comprises, besides, an eccentric 82 which cooperates with a rod 83 for disengaging and engaging the machine to be controlled.

These operations are carried out by means of a steering wheel 84 placed anywhere on the machine, for instance, on the carriage carrying the tools or on the headstock of a machine tool. Above the rods 74 and 80 of the stopping rollers 72 and 78 is disposed a rocking member 86 whose ends are placed in such a way that it is impossible for one of the rollers to leave a notch when the other roller is not in a notch. From this it results that, as in the preceding embodiment, the speed selection can only be executed when the stopping roller 78 is in the corresponding notch and that disengagement is impossible on a selecting operation during which the roller 72 does not engage a notch of the wheel 70. The selecting operation once begun, the pinions 63, owing to the pawls 67, 68 cannot be turned back. The selecting movement must be finished before coupling becomes possible. The selection and coupling are executed by means of a steering wheel 84 by means of which the spider pinions 63 can be rotated, the latter communicating their movement to that of the wheels 64, 65 which is not locked by its pawl and ratchet wheel.

What I claim is:

1. In a machine, a coupling control member, a speed selector control member, a member movable in opposite directions, and means operable during the movement of the movable member in one direction for coupling said movable member with said speed selector control member and operable during movement in the other direction for coupling the movable member with said coupling control member, and a locking device preventing manipulation of the speed selector control member during operation of the coupling control member by said movable member.

2. In a machine, a coupling control member, a speed selector control member, a member movable in opposite directions, and means operable during the movement of the movable member in one direction for coupling said movable member with said speed selector control member and operable during movement in the other direction for coupling the movable member with said coupling control member, stop devices, for locking said coupling control member and said speed selector control member, and a rocking member cooperating with said devices for preventing movement of the stop device associated with one of said control members when the other stop device is not in a predetermined place.

3. In a machine, a coupling control member, a speed selector control member, a member movable in opposite directions, and means operable during the movement of the movable member in one direction for coupling said movable member with said speed selector control member and operable during movement in the other direction for coupling the movable member with said coupling control member, notched members connected with said control members, stop devices engageable in the notched members, and a rocking member cooperating with said stop devices for preventing movement of the stop device associated with the notched member connected with one of said control members, when the other stop device is not in a predetermined place.

4. A machine as claimed in claim 3 wherein said means includes ratchet wheels each connected with one of said notched members.

5. A machine as claimed in claim 3 wherein said means includes spider pinions, and central wheels capable of being rocked in dependence upon the direction of rotation of the spider pinions.

ERNEST ALPHONSE DERUNGS.

REFERENCES CITED

The following references are of record in the file of this patent:

UNITED STATES PATENTS

| Number | Name | Date |
|---|---|---|
| 1,791,742 | Osgood | Feb. 10, 1931 |
| 1,563,742 | Hansen | Dec. 1, 1925 |
| 1,458,554 | Skaer et al. | June 12, 1923 |
| 2,317,336 | Adams et al. | Apr. 20, 1943 |
| 1,991,756 | Lazich | Feb. 19, 1935 |
| 1,849,195 | MacLennan | Mar. 15, 1932 |
| 1,672,802 | Chirol | June 5, 1928 |
| 1,385,083 | McCulley | July 19, 1921 |

FOREIGN PATENTS

| Number | Country | Date |
|---|---|---|
| 138,113 | Austria | Mar. 15, 1932 |
| 473,542 | Great Britain | Oct. 15, 1937 |